(12) United States Patent
Payne (10) Patent No.: US 6,996,485 B2
(45) Date of Patent: Feb. 7, 2006

(54) NULLIFICATION OF MEASUREMENT ERROR, PARTICULARLY WITHIN A DUAL TURBINE FLOW METER USED IN A FUEL DISPENSER

(75) Inventor: Edward A. Payne, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/955,203

(22) Filed: Sep. 30, 2004

(65) Prior Publication Data

US 2005/0283329 A1 Dec. 22, 2005

Related U.S. Application Data

(60) Provisional application No. 60/581,256, filed on Jun. 18, 2004.

(51) Int. Cl.
*G01F 1/12* (2006.01)
(52) U.S. Cl. .................................................. 702/100
(58) Field of Classification Search ................ None
See application file for complete search history.

(56) References Cited

U.S. PATENT DOCUMENTS

| | | | |
|---|---|---|---|
| 4,876,653 A | 10/1989 | McSpadden et al. ........ 364/479 |
| 4,938,054 A | 7/1990 | Dye et al. ...................... 73/3 |
| 5,630,528 A | 5/1997 | Nanaji ........................... 222/1 |
| 5,689,071 A | 11/1997 | Ruffner et al. ........... 73/861.84 |
| 5,831,176 A * | 11/1998 | Morgenthale et al. ... 73/861.77 |
| 6,065,638 A | 5/2000 | Terranova et al. ............. 222/1 |
| 6,067,476 A | 5/2000 | Siler ............................ 700/79 |
| 6,651,517 B1 | 11/2003 | Olivier ................... 73/861.79 |
| 6,692,535 B2 * | 2/2004 | Olivier ................... 73/861.79 |
| 6,721,669 B2 | 4/2004 | Kopl et al. .................. 702/55 |

* cited by examiner

*Primary Examiner*—Michael Nghiem
*Assistant Examiner*—Cindy Khuu
(74) *Attorney, Agent, or Firm*—Winthrow & Terranova, PLLC (57) ABSTRACT

A system and method for correcting a meter calibration curve in a fuel dispenser. The meter may be a turbine flow meter. A meter calibration curve is expressed in a finite number of data points. The meter calibration curve is used to determine the volume and/or flow rate of liquid flowing through the meter. Since the meter calibration curve may contain errors, the meter calibration curve is corrected by determining poles in the meter calibration curve for given known flow rates and/or volumes of liquid passing through the meter, determining an error correction at each of the poles in the meter calibration curve, correcting the expanded meter calibration curve at each of the poles, using linear interpolation to correct points in the meter calibration curve adjacent to the poles.

17 Claims, 9 Drawing Sheets

NULLIFICATION OF MEASUREMENT ERROR, PARTICULARLY WITHIN A DUAL TURBINE FLOW METER USED IN A FUEL DISPENSER

RELATED APPLICATION

This application claims priority to U.S. Provisional Patent Application No. 60/581,256, entitled "Nullification of Measurement Error, Particularly Within A Dual Turbine Flow Meter," filed on Jun. 18, 2004, which is incorporated herein by reference in its entirety.

FIELD OF THE INVENTION

The present invention relates to a process and method to correct error in a meter calibration curve in a meter used in a fuel dispenser to measure fuel, and in particular to correct error in a Roshko-Strouhal calibration curve for a dual rotor turbine flow meter.

BACKGROUND OF THE INVENTION

A turbine flow meter can be used to measure the flow rate of a liquid. Flow rate information can be used to derive the volume of the liquid to accomplish a volumetric meter. One example of a turbine flow meter is described in U.S. Pat. No. 5,689,071 (hereinafter the "'071 patent." In the '071 patent, two turbine rotors are contained within the liquid flow path of a meter housing. The turbine rotors rotate as liquid passes across the rotors. The liquid passes through the first turbine rotor and is directed into the second turbine rotor such that the second turbine rotor rotates in a direction opposite from the first turbine rotor.

Another example of a dual rotor turbine flow meter is described in U.S. Pat. No. 5,831,176 (hereinafter the "'176 patent"). In the '176 patent, a description is provided on how the flow rate of liquid is derived from information concerning the rotation of the turbine rotors. During calibration of the turbine flow meter, a known volumetric flow rate of liquid is placed through the meter. As the liquid flows through the meter, the liquid passes through the rotors causing the rotors to rotate. The rotational frequency of the turbine rotors is measured at various flow rates and frequencies to arrive at a "Strouhal" number for each turbine rotor. The Strouhal number is the frequency of the rotor divided by the volumetric flow rate as follows:

$$Sr = \frac{fr}{Vf}$$

The corresponding "Roshko" numbers for each of the Strouhal numbers are determined for each of the turbine rotors by dividing the frequency of the rotor by the viscosity of the liquid, as follows:

$$Rr = \frac{fr}{v}$$

Figure 2:
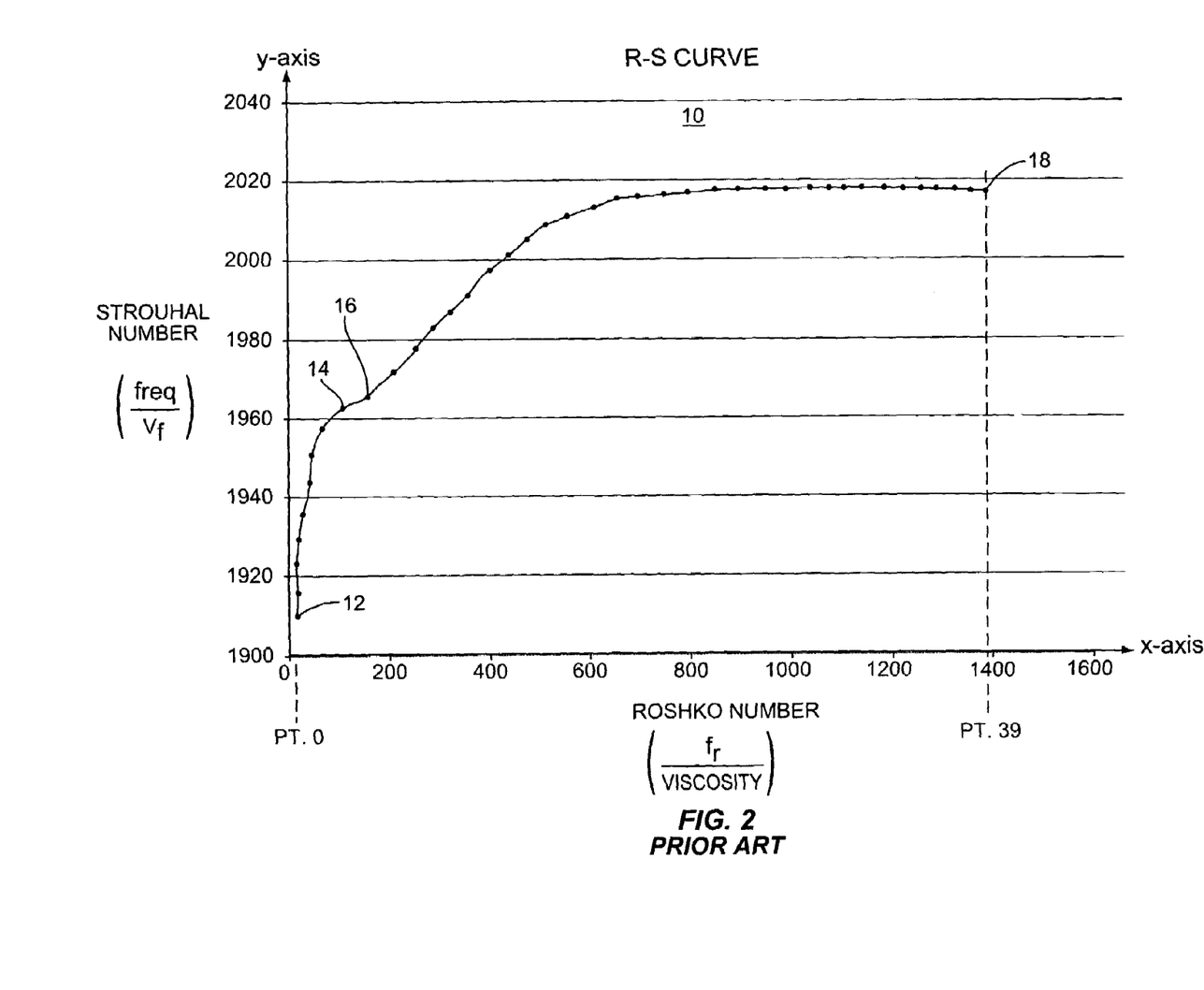
FIG. 2 illustrates a Roshko-Strouhal (R-S) calibration curve having forty coordinate points that is used by a turbine flow meter to measure flow rate of a liquid for given turbine meter rotor frequencies and viscosity of the liquid.

The Strouhal and corresponding Roshko numbers are plotted on a Roshko-Strouhal (R-S) curve and/or are stored in an array of finite points with the Strouhal numbers being plotted in one axis or an array, typically in the y-axis, and the corresponding Roshko numbers being stored in another axis or corresponding array, typically the x-axis. An example of a R-S curve is illustrated in FIG. 2.

During operation, when the R-S curve is used to determine a Strouhal number from a calculated Roshko number as discussed below, linear interpolation is used to determine numbers that fall in between the finite points of the R-S curve. However, since the R-S curve is not a linear function, linear interpolation will introduce error.

If the R-S curve could be converted into a perfect equation instead of being stored as finite points such that interpolation was not required for its use, error would not exist as a result of interpolation. However, the R-S curve is a complex curve that cannot be easily described by a linear or complex order equation. Further, some processes involve the manipulation of raw Roshko and Strouhal coordinate points calculated during calibration of a meter to remove extraneous points that would cause linear interpolation to introduce even more error. However, even with such manual manipulation, error will still exist to some degree in the R-S curve.

During operation of the meter, the liquid flow rate passing through the meter can be determined using the Roshko and Strouhal data from the R-S curve. If there is any error in the R-S curve, this error will be propagated to the volumetric flow rate calculation that is made by the meter during operation. The volumetric flow rate of liquid flowing through the turbine meter is determined as follows:

First, the rotational frequencies of the turbine rotor are measured. As discussed in the '071 patent, pick-off coils or other sensing devices, such as Hall-effect sensors for example, are employed in the turbine meter to detect the rotation of the turbine rotors. The detection device detects the movement of each blade on the turbine rotor and can therefore determine the frequency of rotation as is described in the '071 patent. Once the rotation frequencies of the turbine rotors are measured, the Roshko number for each rotor can be determined according the formula for the Roshko number shown above. After the Roshko number is calculated, the corresponding Strouhal number is determined by the R-S curve or equation. The Strouhal number and the frequency of the turbine rotor are then used to determine the volumetric flow rate according to the rearranged Strouhal formula below. The Strouhal numbers of each rotor may be combined to use as the Strouhal number in the equation below:

$$Vf = \frac{fr}{Sr}$$

The volumetric flow rate calculation is repeated continuously in periodic time increments so that the volumetric flow rate of liquid flowing through the turbine meter is known at any given time. The volume of the liquid can be derived from the volumetric flow rate using time as is well known.

If the turbine flow meter is used in an application in which the liquid flow is distributed aperiodically and frequently, such as in a fuel dispenser where a customer can constantly change the flow of fuel delivery by engaging and disengaging the fuel nozzle, it is more difficult to accurately measure flow rate and volume. Disruptions in the liquid flow result in disruptions in the rotational frequency of the turbine rotors, which in turn affect the calculation of the Roshko numbers. Further, since the R-S curve is derived data that forms a curve where an equation cannot be formulated to perfectly match the curve, approximations of the Strouhal number using the calculated Roshko number will cause error as well.

When the R-S curve is determined during calibration, a line is fitted through the raw Strouhal and corresponding Roshko data points, and the process of line fitting introduces error since extraneous points may alter the final R-S curve. The liquid flow rate variations cannot be controlled, but derivation of the R-S curve is a controlled operation. If the accuracy of the R-S curve can be improved to reduce inherent errors present, the accuracy of the volumetric flow rate calculation will also improve.

Therefore, there exists a need to find a technique and method to more accurately approximate data points in an automated fashion where a perfect equation cannot be derived to match the data points and thus finite points of data are used. In the preferred embodiment, the data points are the Strouhal numbers of the R-S curve since error in the Strouhal numbers will cause error in flow rate calculations of a turbine flow meter.

SUMMARY OF THE INVENTION

A system and method of correcting a calibration curve of a meter used to measure fuel in a fuel dispenser. The meter may be a turbine flow meter that measures the flow rate of a liquid passing through the meter. A meter calibration curve is received. The meter calibration curve can be used to determine the flow rate or volume of liquid passing through the meter. The meter calibration curve is determined beforehand through a calibration process. The meter calibration curve is expressed in a finite number of data points. The meter calibration curve may contain errors.

A plurality of poles of meter calibration curve are determined by a control system by determining an expected value on the meter calibration curve for a plurality of flow rates or volumes of liquid flowing through the meter. Next, the error in the meter calibration curve is computed by determining the difference between the meter calibration curve and the plurality of poles. An error correction at each of said plurality of poles is next calculated. The meter calibration curve is corrected to form a corrected curve by applying the error correction to the meter calibration curve at the plurality of poles and using linear interpolation to correct the meter calibration curve at points adjacent to the plurality of poles. The error correction may be an error correction coefficient or an adder/subtracter.

In an alternative embodiment, the meter calibration curve is expanded first using linear interpolation to create an expanded curve having a greater number of data points than said meter calibration curve before the error correction is performed. The corrected curve may be reduced back to the same number of finite data points as present in the original uncorrected meter calibration curve at the end of the correction process.

The meter calibration curve may be stored in memory in the meter and obtained from the memory before being corrected, or the meter calibration curve may be obtained from a system in the calibration process. The corrected meter calibration curve may be stored in the memory of the meter when completed or in a control system in communication with the meter to be used to perform flow rate and/or volume calculations regarding liquid passing through the meter.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Throughout the description of the present invention below, references are made to source code contained in Appendix A to this application, which forms part of the detailed description of the invention and is incorporated herein.

The preferred embodiment of the present invention is a process and technique to perform error correction on a Roshko-Strouhal (R-S) curve or array that is used for measurement of flow rate of liquid flowing through a turbine meter. The original R-S curve is a complex curve that is derived empirically and is approximated using discrete data points. The R-S curve is used to derive flow rate of liquid by determining a Roshko number and then correlating the Roshko number to a Strouhal number that can be used to calculate flow rate as previously described in the "Background of the Invention" section above. The R-S curve is determined during a calibration step and may contain error since approximations are used to represent the R-S curve.

In the present invention, the Strouhal numbers in the R-S curve are verified against correct Strouhal numbers calculated in a separate verification step where known volumes of liquid are passed through the turbine meter at known flow rates. The correct Strouhal values are compared to Strouhal numbers stored in the R-S curve to determine an error correction factor for each Strouhal number data point. Linear interpolation is used to form an error correction curve that is multiplied against the original R-S curve to form a corrected R-S curve. The error correction data point is applied to the original R-S curve to form a corrected R-S curve. The points of the corrected R-S curve are then used going forward for obtaining the Strouhal numbers that are used to calculated flow rate. The details and aspects of the present invention are described below.

Figure 1:
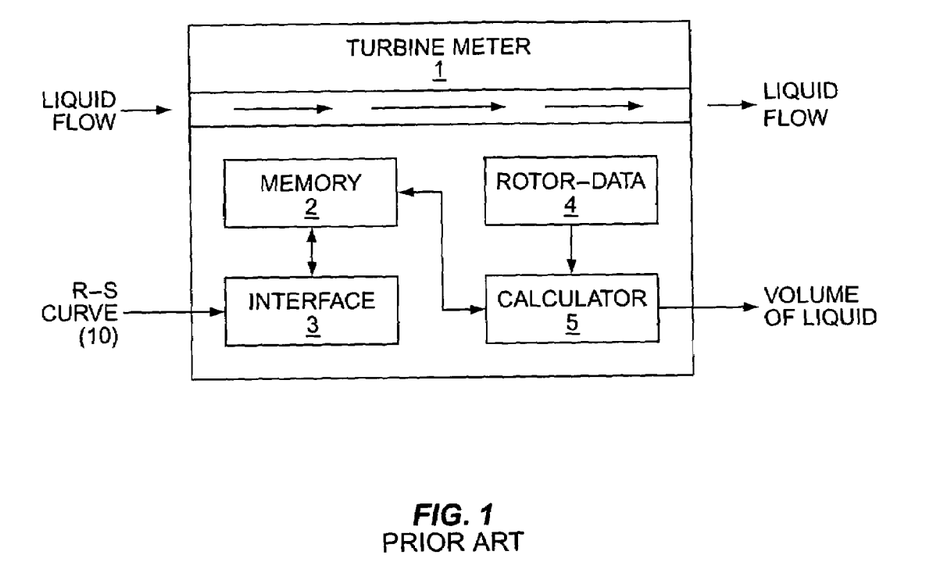
FIG. 1 illustrates a block diagram of a turbine flow meter for measuring liquid in the prior art.

FIG. 1 illustrates a block diagram of a turbine flow meter 1 that is used to measure the flow rate of liquid. The turbine flow meter 1 may be the turbine flow meter described in U.S. Pat. No. 5,689,071 (hereinafter the "071 patent") incorporated herein by reference in its entirety. The error correction aspects of the present invention that are used by the turbine flow meter 1 are described below starting with FIG. 3A. As can be seen from FIG. 1, liquid flow enters the turbine meter 1 on one end and exits the turbine flow meter 1 on the other end. As the liquid flow passes through the meter 1, two turbine rotors (not shown), like those disclosed in the '071 patent, rotate. Pick-off coils or other detection devices detect the rotation of the turbine rotors and provide the frequency of the rotation in the form of rotor data 4. The turbine flow meter 1 contains a calculator 5, which may be a microcontroller, microprocessor, or other electronic circuitry, that receives the rotor data 4 and in turn calculates the liquid flow rate and volume of liquid passing through the meter 1.

The meter 1 also includes memory 2 that is accessed by the calculator 5. During calibration of the meter 1, the Roshko-Strouhal (R-S) curve 10 for each rotor may be loaded into memory 2 via an interface 3. The R-S curve 10 for each rotor is determined using the technique described in the "Background of the Invention" section above. The R-S curve 10 is used by the calculator 5 to determine the volumetric flow rate (Vr) of the liquid flowing through the meter and in turn calculate the volume (V) of the liquid. The calculator 5 communicates the volume (V) of the liquid to another system. In the example of a fuel dispenser (not shown), the meter 1 would communicate the volume of liquid data to a control system or other electronic circuitry to control the volume display on the dispenser indicating the volume of fuel dispensed. An example of a fuel dispenser and how meters are used to determine volume for display to a customer is contained in U.S. Pat. Nos. 6,721,669; 6,067,476; 6,065,638; 5,630,528; 4,938,054; 4,876,653; and 6,651,517, all of which are incorporated by reference herein in their entireties.

An example of a R-S curve 10 for one of the rotors of the turbine flow meter 1 determined during calibration of the meter 1 is illustrated in FIG. 2. This R-S curve 10 is used to determine the volumetric flow rate of liquid passing through the meter 1 as discussed in the "Background of the Invention" section above, and is known in the prior art.

The R-S curve 10 is shown in a graphical representation of a line in two-dimensions, where for a given Roshko number in the x-axis, a corresponding Strouhal number in the y-axis can be ascertained. Since the R-S curve 10 is determined for each meter 1 and its rotors specifically, there are two R-S curves 10 unique to a particular meter 1, one for each rotor.

The R-S curve 10 for each rotor is stored in memory 2 in the form of an array having a finite amount of coordinate data points. In one embodiment, the R-S curve 10 for one rotor is stored in two separate one-dimensional arrays, with one array containing the Roshko numbers and the other array containing the corresponding Strouhal numbers. The same index into the arrays will provide correlating Roshko and Strouhal numbers. In this example, there are four R-S arrays, two for the first rotor, referred to as "rotor A," and two for the second rotor, referred to as "rotor B." The R-S array size is forty points meaning that the R-S curve will be stored in a two-dimensional array having a size of forty coordinate points. Linear interpolation can be used to derive Roshko and Strouhal numbers that fall in between coordinate data points as illustrated in the R-S curve 10 in FIG. 2. Examples of the Roshko number array and a corresponding Strouhal number array are contained in source code in Appendix A and as shown below. Note that the Roshko numbers for each rotor are the same, so one array, "rotor_X," is used to store the Roshko numbers for each rotor.

```
double rotor_X [40]; // Roshko numbers for each rotor //
double rotorA_Y [40]; // Strouhal numbers for rotor A //
double rotorB_Y [40]; // Strouhal numbers for rotor B //
```

As illustrated in FIG. 2, there are forty data points on the R-S curve 10. The first point, point 0 is referred to as point 12, is comprised of the Roshko and Strouhal numbers in the "0" index into the R-S arrays referenced above. In this embodiment, the Roshko numbers for each rotor are the same, but the corresponding Strouhal numbers may be different. If FIG. 2 were the R-S curve 10 for "rotor A", the "rotor_X" array and "rotorA_Y" array are indexed to find a point on the R-S curve 10. Point 18 is the fortieth or last point in the R-S curve 10. Point 18 is referred to as "point 39" since the index into the R-S arrays ranges from "0" to "39" comprising a total of forty points. Note that the arrays that approximate the R-S curve 10 could be comprised or more or less data points according to design preference.

Examples of Roshko and Strouhal numbers that may be used to approximate a R-S curve 10 for rotor A and rotor B are shown below and are contained in the source code in Appendix A. Note that the "rotor_X" array contains Roshko numbers for both rotor A and rotor B.

```
double rotor_X[ ] = // Roshko values, 40 pts //
{
                    1,
                    1.1937766,
                    1.4251027,
                    1.7012543,
                    2.0309176,
                    2.424462,
                    2.8942661,
                    3.4551073,
                    4.1246264,
                    4.9238826,
                    5.8780161,
                    7.0170383,
                    8.3767764,
                    10,
                    11.937766,
                    14.251027,
                    17.012543,
                    20.309176,
                    24.24462,
                    28.942661,
                    34.551073,
                    41.246264,
                    49.238826,
                    58.780161,
                    70.170383,
                    83.767764,
                    100,
                    119.37766,
                    142.51027,
                    170.12543,
```

```
                    203.09176,
                    242.4462,
                    289.42661,
                    345.51073,
                    412.46264,
                    492.38826,
                    587.80161,
                    701.70383,
                    837.67764,
                    1000
};
double rotorA_Y[ ] = // rotor A Strouhal values, 40 pts //
{
                    1405.6828,
                    1460.3792,
                    1513.2728,
                    1563.6144,
                    1610.9346,
                    1654.8483,
                    1694.9973,
                    1731.0703,
                    1762.8546,
                    1790.2879,
                    1813.4942,
                    1832.7913,
                    1848.6715,
                    1861.7561,
                    1872.7321,
                    1882.2804,
                    1891.0044,
                    1899.3688,
                    1907.6551,
                    1915.9424,
                    1924.1126,
                    1931.8831,
                    1938.8634,
                    1944.6291,
                    1948.8052,
                    1951.1497,
                    1951.6237,
                    1950.4391,
                    1948.0697,
                    1945.2206,
                    1942.7487,
                    1941.5366,
                    1942.329,
                    1945.5498,
                    1951.1312,
                    1958.4024,
                    1966.1008,
                    1972.5915,
                    1976.4061,
                    1977.2361
};
double rotorB_Y[ ] = // rotor B Strouhal values, 40 pts //
{
                    1661.8836,
                    1751.0332,
                    1820.3686,
                    1878.71,
                    1929.7376,
                    1974.4551,
                    2012.7645,
                    2044.3883,
                    2069.3314,
                    2088.0332,
                    2101.3316,
                    2110.3256,
                    2116.2034,
                    2120.0781,
                    2122.8601,
                    2125.1773,
                    2127.3481,
                    2129.4007,
                    2131.1304,
                    2132.1812,
                    2132.1374,
                    2130.6145,
                    2127.3337,
                    2122.1761,
                    2115.2072,
                    2106.6729,
                    2096.968,
                    2086.5839,
                    2076.0427,
                    2065.8307,
                    2056.3406,
                    2047.8352,
                    2040.4398,
                    2034.1672,
                    2028.9725,
                    2024.8241,
                    2021.7645,
                    2019.9189,
                    2019.3894,
                    2019.9474
};
```

The prior art stops at this point and uses the R-S curve 10 as illustrated in FIG. 2 to determine the volumetric flow rate and volume of liquid passing through the meter 1. If the R-S curve 10 contains errors, these errors will propagate to the final volumetric flow rate calculation. Any R-S curve that is stored in the form of finite coordinate points and not as an equation will always contains some degree of error. Several factors cause the R-S curve to have greater error than desired. For instance, interpolation of Roshko and Strouhal numbers that fall in between data points in the array of the R-S curve 10 introduce error. Extraneous data points from the raw Roshko and Strouhal numbers may have been present during calibration that cause linear interpolation to be even more erroneous. Even if manual manipulation of the raw Roshko and Strouhal numbers is performed to remove extraneous data points, such manual manipulation cannot eliminate error caused by linear interpolation.

Therefore, because of the error in the R-S curve 10, or any curve that is used to approximate a measurement, such as for a flow meter in the present example, the present invention presents a technique and method that may be used to reduce the error present in data points, such as data points that approximate a R-S curve 10, when linear interpolation is used to approximate a valve in the curve.

Figure 3A:
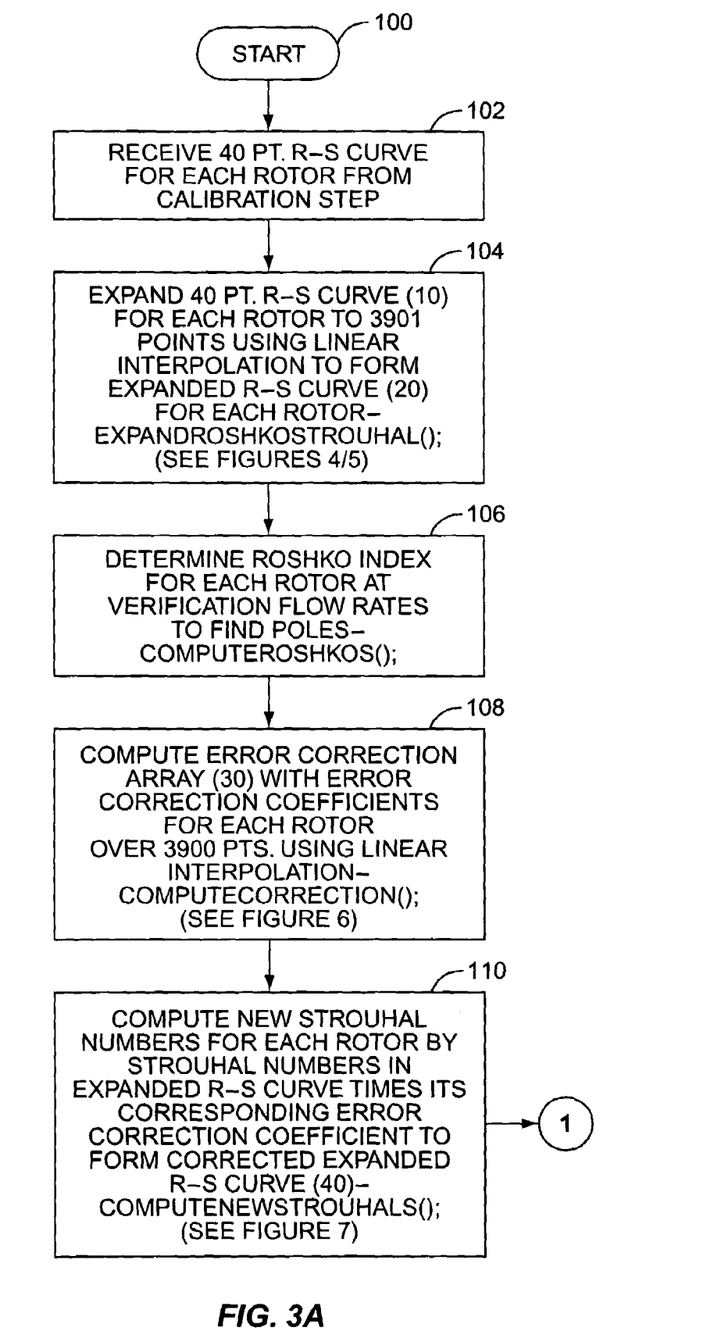
FIGS. 3A and 3B is a flowchart that contains the operation of the present invention to eliminate error in a R-S curve.
Figure 3B:
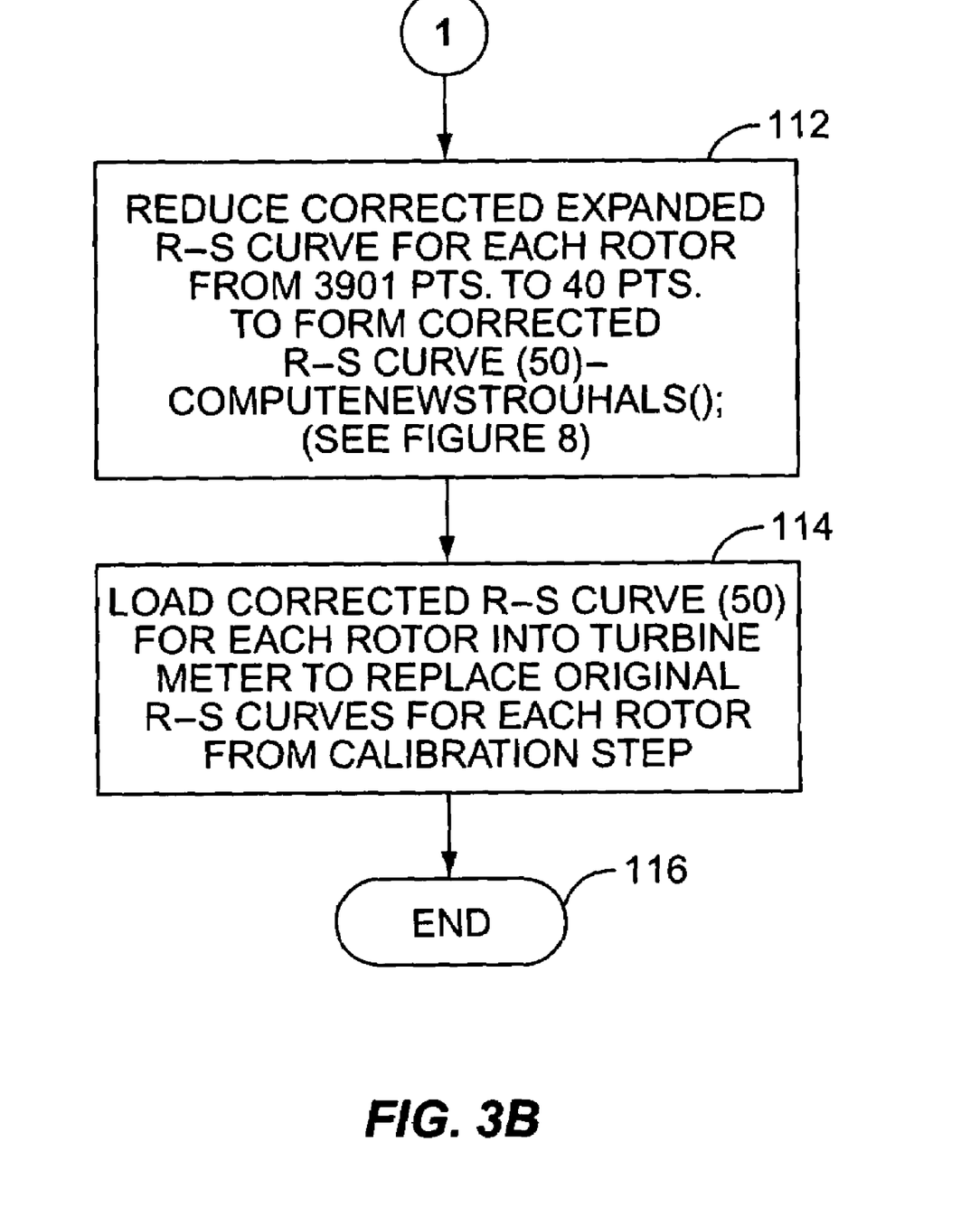

A flowchart of the methods and techniques employed by the present invention is illustrated in FIGS. 3A and 3B. FIGS. 4-8 illustrate R-S curves that result from the operations of the steps set forth in FIGS. 3A and 3B. Therefore, as reference is made to FIGS. 3A and 3B below, reference will also be made to FIGS. 4-8 to show the results of the operations performed by the present invention. Note that although the present invention is described with respect to a R-S curve 10 used to determine flow rate of a liquid passing through a turbine flow meter 1, the present invention may be employed for any type of data points or curve that is used for determination of values, such as measurement values for example.

As illustrated in FIG. 3A, the process starts (step 100), and the R-S curve 10 for each rotor of the turbine rotor meter 1 is received via the interface 3 and retrieved by the calculator 5 from memory 2 (step 102). The R-S curve 10 for each rotor has been previously calculated in a calibration process of the meter 1, as described above. The calculator 5 then uses the R-S curve 10 for each rotor stored in memory 2 to perform the present invention. As previously discussed and as illustrated in FIG. 2, the R-S curve 10 is comprised of forty discrete coordinate points in this example.

Figure 4:
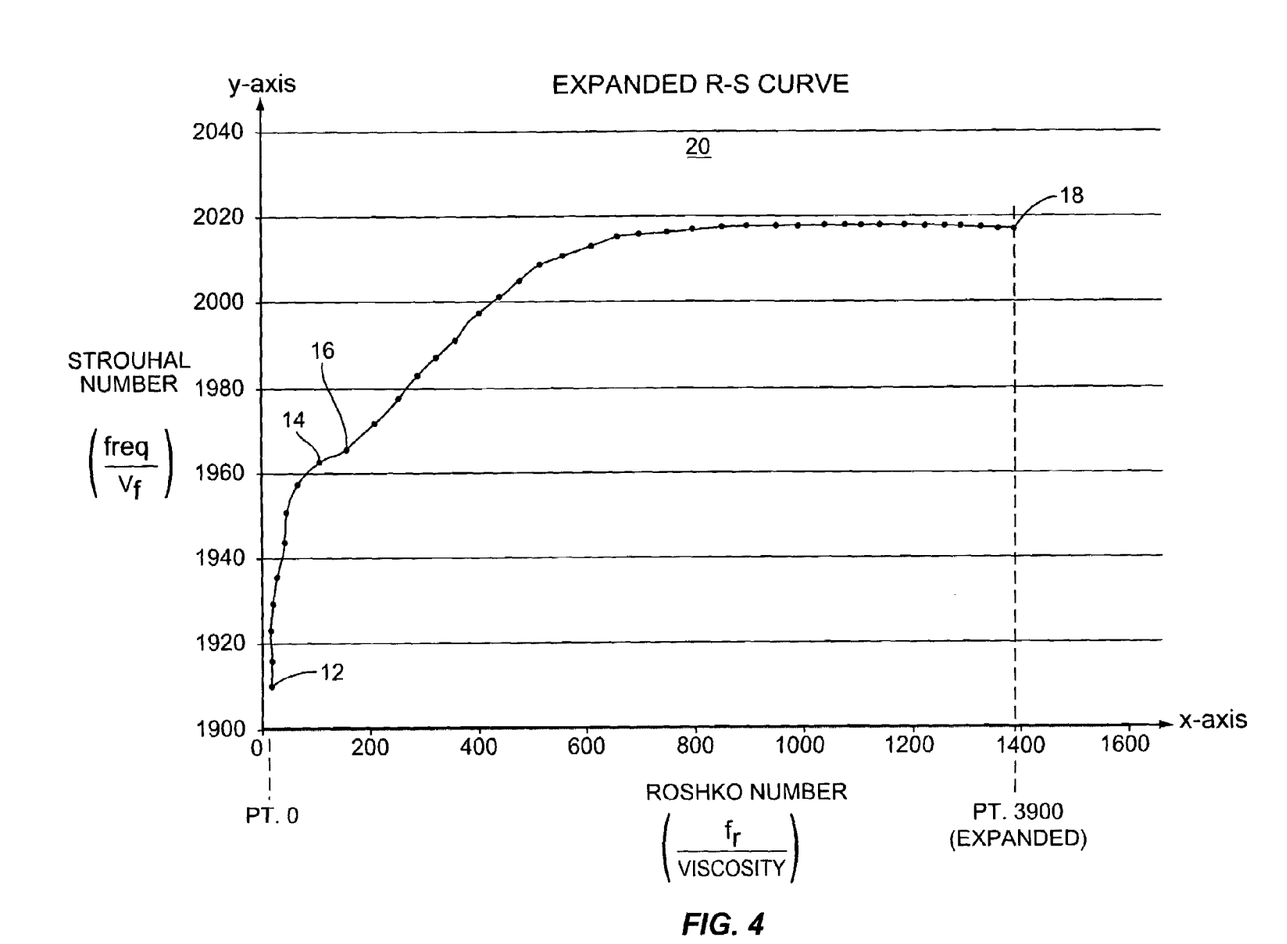
FIG. 4 is an illustration of an expanded R-S curve to provide 3901 coordinate points linearly interpolated from the R-S curve illustrated in FIG. 2.

Next, the R-S curve 10 for each rotor is expanded by a factor of 100 to a total of 3901 points using linear interpolation to form an expanded R-S curve 20 as illustrated in FIG. 4 (step 104). In one embodiment, step 102 is performed by the "ExpandRoskhoStrouhal ( );" C++ function in the source code in Appendix A and as contained below, to produce three arrays to form an expanded R-S curve 20—"rotor_X_expanded," "rotorA_Y_expanded," and rotorB_Y_expanded." Again, the "rotor_X_expanded" array contains the expanded Roshko numbers for both rotors' expanded R-S curves 20.

```
// ExpandRoshkoStrouhal(void) -- expand Roshko array from
40 to 3901 points
void TForm1::ExpandRoshkoStrouhal (void)
{
  char buf[128];
  int i, j;
  double y;
  for (i = 0; i < 39; i++)
  {
    for (j = 0; j < 100; j++)
    {
      InterpolateLinear((double) (i), rotor_X[i],
(double)(i + 1), rotor_X[i + 1], (double(i) + double(j) /
100.0), &y);
        rotor_X_expanded[(i * 100) + j] = y;
        InterpolateLinear((double) (i), rotorA_Y[i],
(double)(i + 1), rotorA_Y[i + 1], (double(i) + double(j)
/ 100.0), &y);
        rotorA_Y_expanded[(i * 100) + j] = y;
        InterpolateLinear((double) (i), rotorB_Y[i],
(double)(i + 1), rotorB_Y[i + 1], (double(i) + double(j)
/ 100.0), &y);
        rotorB_Y_expanded[(i * 100) + j] = y;
    }
  }
  rotor_X_expanded[3900] = rotor_X[39];
  rotorA_Y_expanded[3900] = rotorA_Y[39];
  rotorB_Y_expanded[3900] = rotorB_Y[39];
}
```

Since the original R-S curve 10 is comprised of 40 points, expansion of the 40 points, point 0 through point 39, by a factor of 100 will yield 3901 points, point 0 through point 3900, in the expanded R-S curve 20. Point 0 (12) in the R-S curve 10 in FIG. 2 remains Point 0 (12) in the expanded R-S curve 20 in FIG. 4. Point 39 (18) in the R-S curve 10 in FIG. 2 is point 3900 (18) in expanded R-S curve 20 in FIG. 4.

Figure 5:
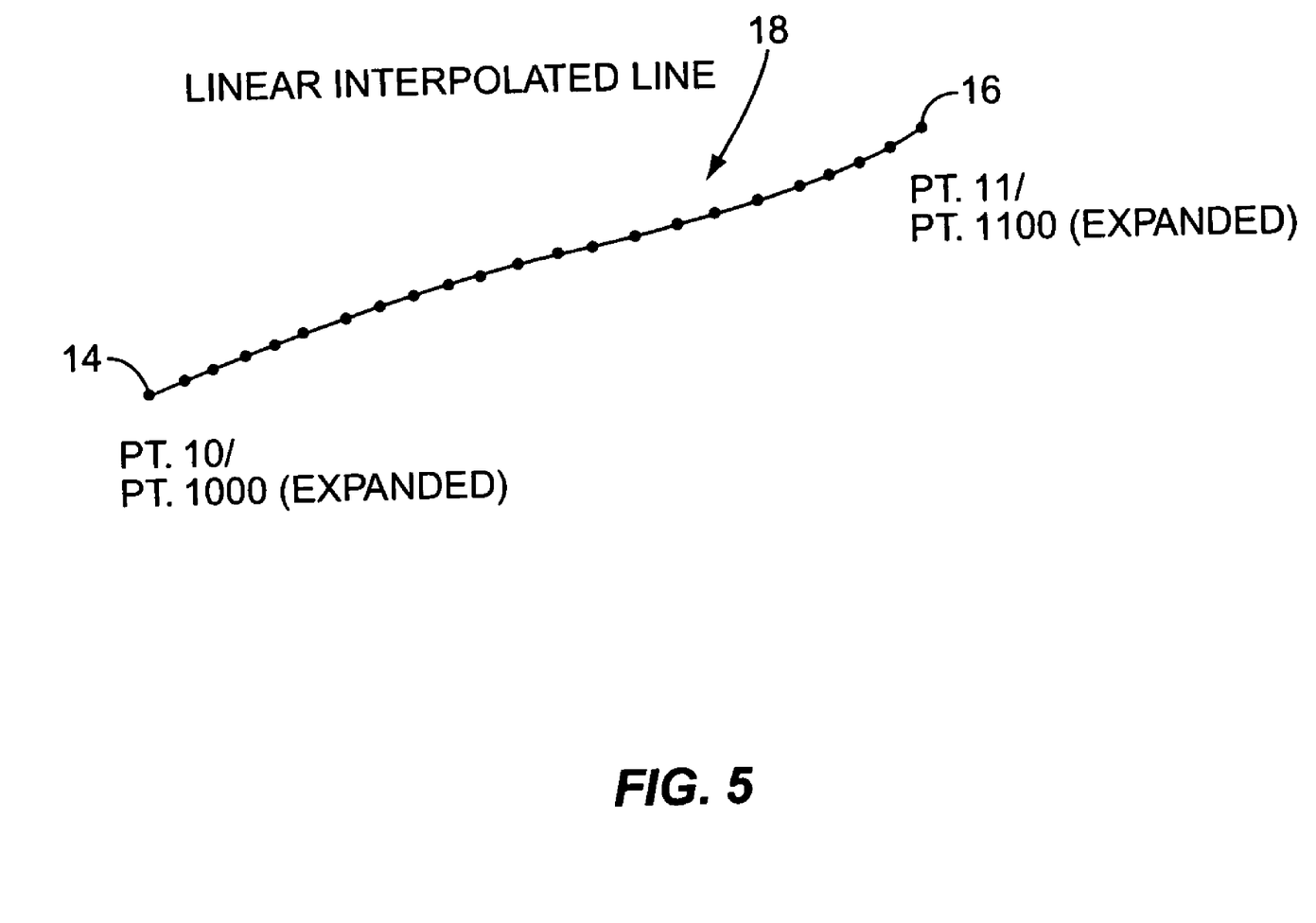
FIG. 5 is an illustration of linear interpolation between two segments of the R-S curve illustrated in FIG. 2 to formulate the expanded R-S curve illustrated in FIG. 4.

FIG. 5 illustrates linear interpolation performed between point 10 (14) and point 11 (16) in the R-S curve 10 to expand this region of the R-S curve to contain 100 points. Although FIG. 5 does not show 100 points formed between points 10 (14) and 11 (16) due to limitations on space, the present invention contemplates linearly interpolating 100 points between points 10 (14) and 11 (16) in the present example. The linear interpolation consists of determining 100 evenly spread points in between each pair of adjacent points in the R-S curve 10 to form an interpolated line between the two adjacent points.

Expansion of the R-S curve 10 to provide more points in between adjacent points will allow the calculated Roshko numbers to more closely match a point in the expanded R-S curve 20 to perform error correction of the corresponding Strouhal number as will be described later below in step 110. If the R-S curve 10 were not expanded before error correction is performed, the error correction would be performed on one of the forty points in the R-S curve 10 when the error correction actually applied to a data point in between that is not closely adjacent to a R-S coordinate point in the R-S curve 10, thereby introducing error. However, this step of expanding the R-S curve 10 is an optional step and may not need to be performed, especially if the R-S curve 10 has a high enough resolution for the desired tolerance of error that is allowable for a particular application.

The next step is to determine correction poles along the expanded R-S curve 20 (step 106). Correction poles are used to determine the true Strouhal number for a given Roshko number to then compare against the corresponding Strouhal number stored in the expanded R-S curve 20 to determine the difference or error present in the R-S curve 10. In this manner, the error can be eliminated or nullified in the expanded R-S curve 20 by determining an error correction that makes the Strouhal value in the expanded R-S curve 20 equal to the correct Strouhal number determined in a verification step of the meter 1.

An example of how the poles are determined is found in the C++ function "ComputeRoshkos ( );" contained in the source code in Appendix A. Each pole is determined by providing known flow rates of liquid through the turbine meter 1 in a verification step, after calibration where the original R-S curve 10 is determined, and then determining the corresponding Roshko number for each rotor at these known flow rates. The computed Strouhal numbers for each Roshko number are then compared against the stored Strouhal numbers in the expanded R-S curve 20, and any difference is error. In one embodiment, five flow rates are used to verify the meter 1 thereby producing five Roshko numbers or five poles.

Figure 6:
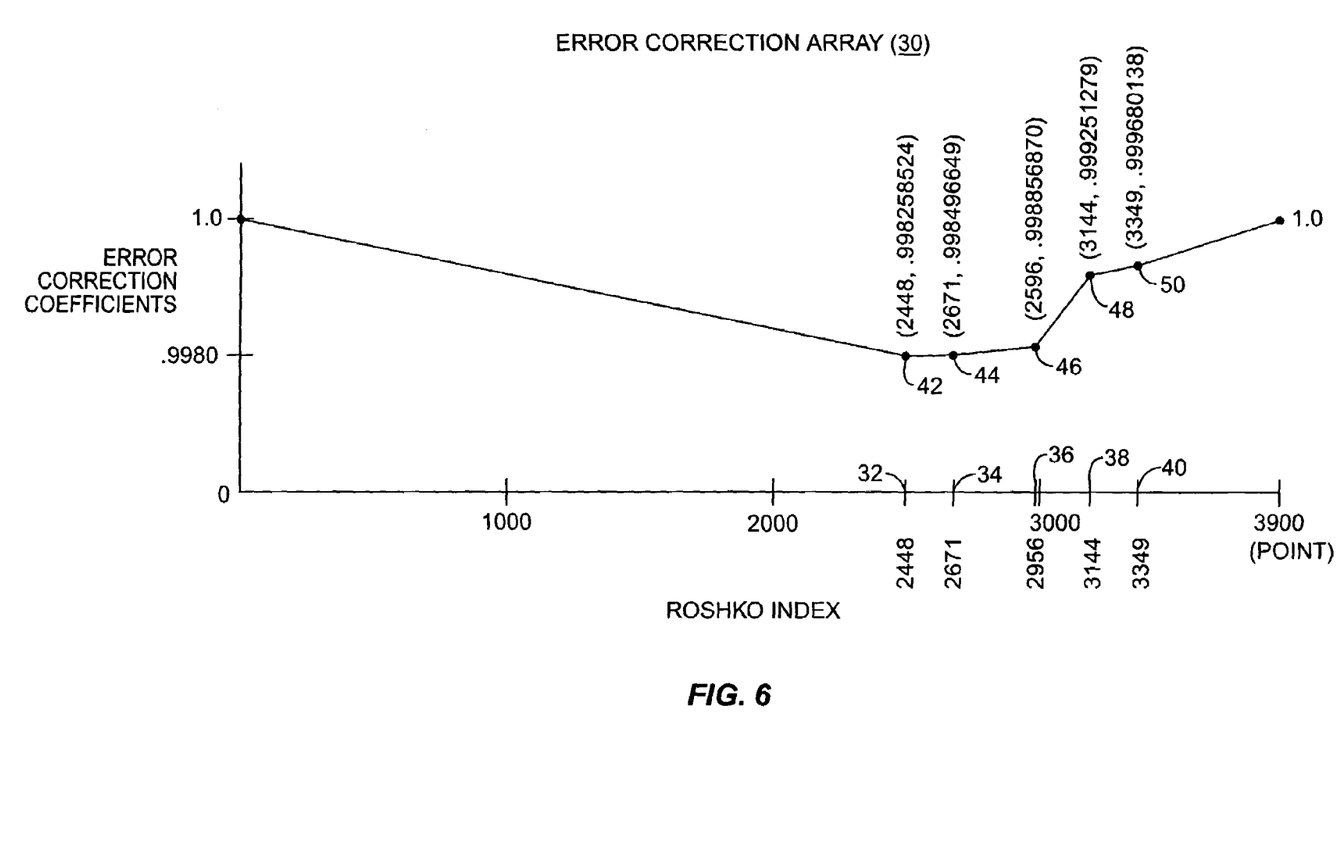
FIG. 6 is an illustration of an error correction array containing correction poles at various Roshko numbers indicative of different flow rates of liquid.

Examples of the poles that are determined in a verification step of the meter 1 are illustrated in FIG. 6. Note that five Roshko numbers were determined by providing five different flow rates through the meter 1. The Roshko numbers are converted into indexes into the expanded R-S curve 20 by finding the Roshko number in the expanded R-S curve 20 that contains a Roshko number closest to the Roshko number determined in verification and then storing that index into the array of the expanded R-S curve 20. In this example, the Roshko numbers are labeled in FIG. 6 as points 32, 34, 36, 38, and 40, having index values of 2448, 2671, 2956, 3144, and 3349 into the arrays—"rotorA_Y_expanded" and "rotorB_Y_expanded" depending on the rotor being analyzed.

After each of the poles are determined and their corresponding Roshko indexes into the expanded R-S curve 20 are determined in the verification of the meter 1, the next step is to compute the error correction coefficients for the entire expanded R-S curve 20 (step 108). One method to perform this function is contained in the C++ function "ComputeCorrection ( ); contained in the source code in Appendix A.

At the poles, points 42, 44, 46, 48, and 50 indicate the error correction coefficient necessary to be multiplied against the Strouhal number in the expanded R-S curve 20 to make the Strouhal number match the calculated, correct Strouhal number during verification of the meter 1. For example, at the first pole 42, the correction factor is 0.998258524, meaning that the Strouhal number in the expanded R-S curve 20 for Roshko index 2448 should be multiplied by 0.998258524 to be correct and match the Strouhal number determined for Roshko index 2448 during verification of the meter 1. The error correction coefficient is obtained by dividing the correct Strouhal numbers obtained during verification for a given Roshko index by the Strouhal number in the expanded R-S curve 20 for the same given Roshko index.

At this point, only five error correction coefficients have been calculated based on five actual calculated Strouhal numbers during verification of the meter 1. Since it is not feasible to perform verification for all 3901 points in the expanded R-S curve 20, linear interpolation is used to determine the error correction line illustrated in FIG. 5 that will be used to perform a correction of all the Strouhal numbers in the expanded R-S curve 20 in a later step. Note that more than five poles may be used. In order to perform this linear interpolation, the end points, point 0 (12) and point 3900 (18) are set at an error correction coefficient of 1.0, meaning no error since the error for these indexes was not determined during verification of the meter 1. The resulting error correction line 10 is stored in the form of an error correction array 30, as illustrated in FIG. 5, whereby an error correction coefficient is contained for each index into the expanded R-S curve 20. Examples of the error corrections arrays for each rotor, rotor A and rotor B, are contained in the source code in Appendix A as "correctionA" and "correctionB." Note that the error correction array could contain adders or subtracters rather than coefficient multipliers.

An example of error correction coefficients for select Roshko indexes for the error correction array 30 according to the example provided above is shown below.

| Index | Error Correction Coefficient |
|-------|------------------------------|
| 0     | 1.0000000                    |
| 1     | 0.9999992                    |
| 2     | 0.9999985                    |
| 3     | 0.9999977                    |
| ...   |                              |
| 3143  | 0.9991913                    |
| 3144  | 0.9991934                    |
| 3145  | 0.9991956                    |
| ...   |                              |
| 3347  | 0.9996287                    |
| 3348  | 0.9996308                    |
| 3349  | 0.9996330                    |
| 3350  | 0.9996351                    |
| 3351  | 0.9996373                    |
| ...   |                              |
| 3369  | 0.9996758                    |
| 3370  | 0.9996780                    |
| 3371  | 0.9996801                    |
| 3372  | 0.9996807                    |
| 3373  | 0.9996813                    |
| ...   |                              |
| 3897  | 0.9999982                    |
| 3898  | 0.9999988                    |
| 3899  | 0.9999994                    |
| 3900  | 1.0000000                    |

Figure 7:
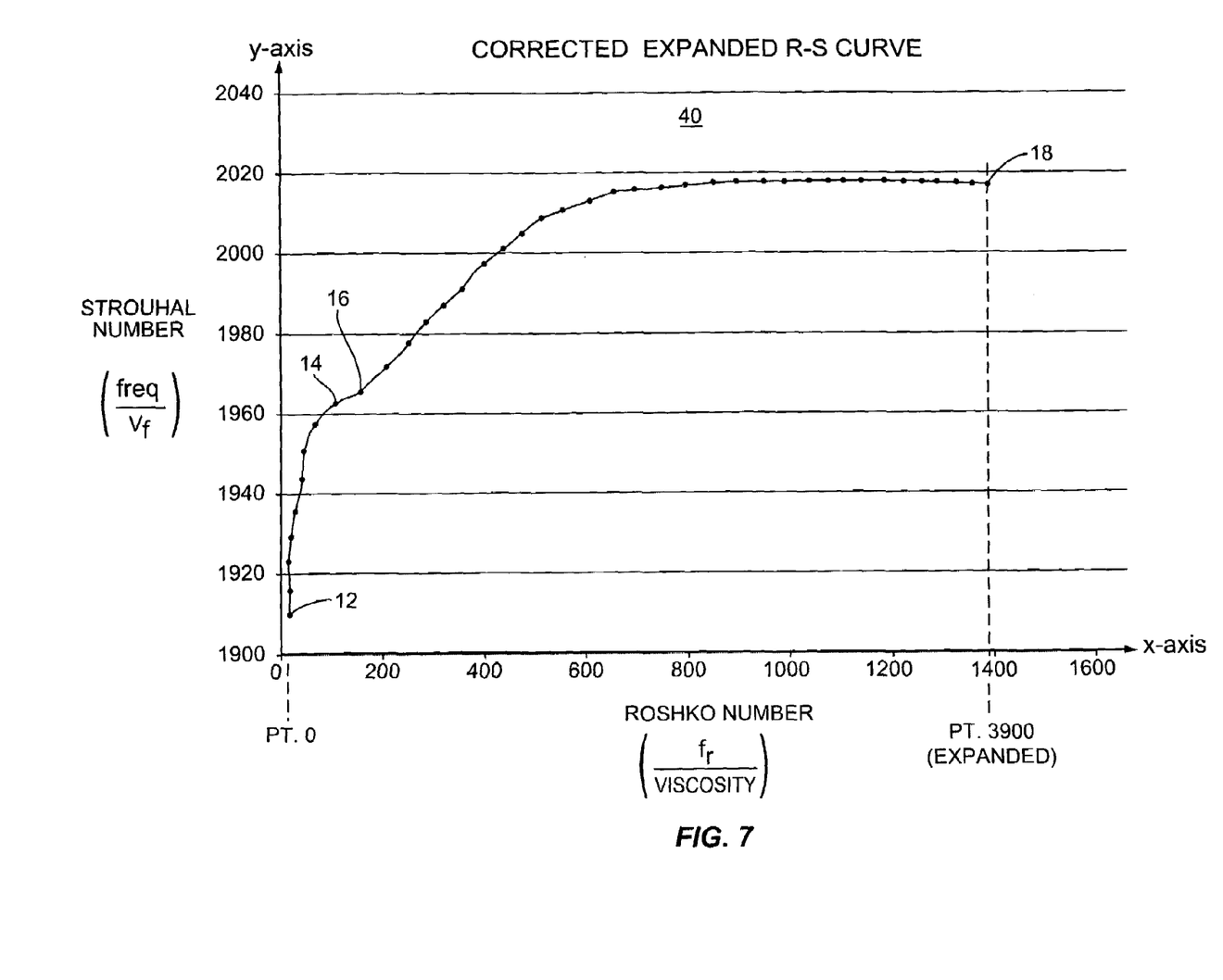
FIG. 7 is an illustration of a corrected expanded R-S curve derived using error corrections illustrated in FIG. 6 as applied to the expanded R-S curve illustrated in FIG. 4.

Next, in step 110, the error correction array 30 is used to compute new Strouhal numbers in the expanded R-S curve 20. The correction coefficients contained in the error correction array 30 are multiplied by their corresponding Strouhal numbers in the expanded R-S curve 20 to perform error correction on the Strouhal numbers on the expanded R-S curve 20. An example of this function is contained in the C++ function "ComputeNewStrouhals ( );" in the source code contained in Appendix A. The code steps through each index and multiplies the error correction coefficient at the index in the error correction array 30 times the Strouhal number at the same index in the expanded R-S curve 20 to form an expanded corrected R-S curve 40 as illustrated in FIG. 7 and as shown in the code below.

```
for(i = 0; i < 3901; i++)
{
    new_rotorA_Y_expanded[i] = rotorA_Y_expanded[i] *
correctionA[i];
    new_rotorB_Y_expanded[i] = rotorB_Y_expanded[i] *
correctionB[i];
}
```

The expanded corrected R-S curve 40 is stored in the form of arrays containing the corrected Strouhal numbers called "new_rotorA_Y_expanded" and "new_rotorB_Y_expanded" as contained in the source code in Appendix A. Note that the Roshko numbers stored in the array rotor_X_expanded" are still used for the x-axis into the expanded corrected R-S curve 40 for each rotor.

Lastly, in step 112, now that the expanded R-S curve 20 has been corrected to form the expanded corrected R-S curve 40, the expanded corrected R-S curve 40 is reduced from the expanded 3901 points back down to the original 40 points to form a corrected R-S curve that is stored in the memory 2 of the meter 1. An example of this function is contained in the C++ function "ComputeNewStrouhals ( );" contained in the source code in Appendix A and is repeated below where every $100^{th}$ index point into the corrected expanded R-S curve 40 is used as a data point in the corrected R-S curve 50.

```
// extract the 40-pt subsets from the expanded arrays //
for(i = 0; i < 40; i++)
{
    new_rotorA_Y[i] = new_rotorA_Y_expanded[i * 100];
    new_rotorB_Y[i] = new_rotorB_Y_expanded[i * 100];
}
```

Figure 8:
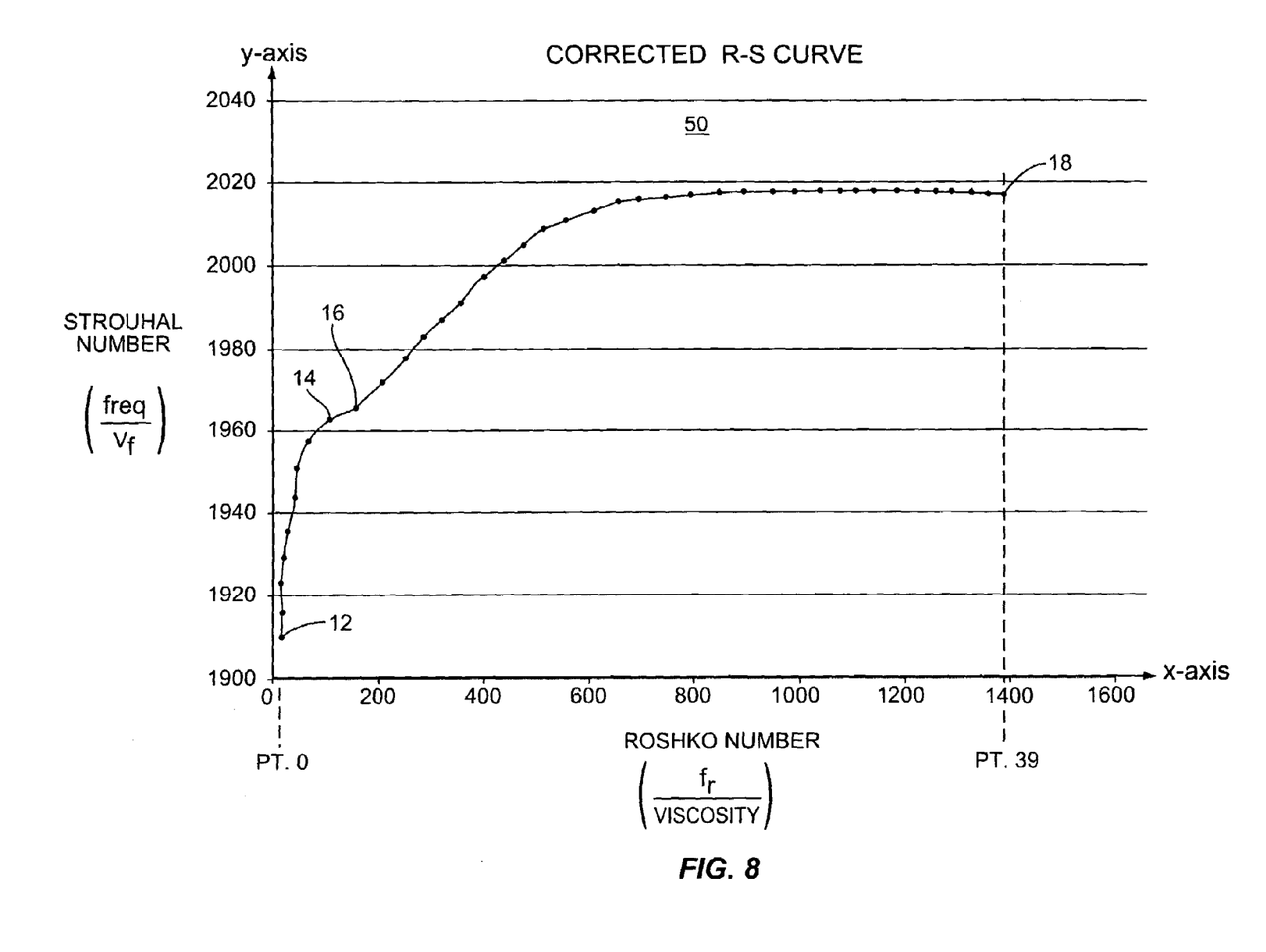
FIG. 8 is an illustration of a reduced corrected R-S curve that is used by the turbine meter to derive flow rate of liquid, and is formed by reducing the corrected expanded R-S curve illustrated in FIG. 7 from 3901 coordinate points to 40 coordinate points.

An example of the corrected R-S curve 50 is illustrated in FIG. 8. The corrected R-S curve 50 is stored in the form of a 40-point array, with the new corrected Strouhal numbers for each rotor being stored in the arrays "new_rotorA_Y" and "new_rotorB_Y." The Roshko points that make up the x-axis of the corrected R-S curve 50 are taken from the array "rotor_X" described above.

The last step in the process (step 114) loads the corrected R-S curve 50 for each rotor into memory 2 of the meter 1 in place of the original R-S curve 10. If the original R-S curve 10 was never loaded into memory 2 and the original R-S curve 10 was obtained from another source, the corrected R-S curve 50 will not overwrite a previously stored curve. The calculator 5 now uses the corrected R-S curve 50 to determine the Strouhal number using the calculated Roshko number during operation of the meter 1.

Note that the present invention can be used with any measurement data or curve, and may be used with a turbine meter 1 having only one rotor. Also note that another calculator or processor not contained within the turbine flow meter 1 could be employed to perform the present invention with the final corrected R-S curve 50 being loaded into the memory 2 at the end of the process (step 114 in FIG. 3).

Those skilled in the art will recognize improvements and modifications to the preferred embodiments of the present invention. All such improvements and modifications are considered within the scope of the concepts disclosed herein and the claims that follow.

I claim:

1. A method of correcting a calibration curve of a meter used to measure fuel in a fuel dispenser, comprising the steps of:
   (a) receiving a meter calibration curve used to determine flow rate or volume of liquid passing through the meter expressed in a finite number of data points;
   (b) determining the location of a plurality of poles on said meter calibration curve by determining an expected value on said meter calibration curve for a plurality of flow rates or volumes of liquid flowing through the meter;
   (c) computing error in said meter calibration curve at the location of said plurality of poles by determining the difference between the flow rate or volume of liquid indicated by said meter calibration curve at the location of said plurality of poles and said plurality of flow rates or volumes for said plurality of poles;
   (d) computing an error correction for said meter calibration curve at each of said plurality of poles based on said computed error in said step (c); and
   (e) correcting said meter calibration curve to form a corrected curve by applying said error correction to said meter calibration curve at the location of said plurality of poles and using linear interpolation to correct said meter calibration curve at points adjacent said plurality of poles.

2. The method of claim 1, further comprising expanding said meter calibration curve using linear interpolation to create an expanded curve having a greater number of data points than said meter calibration curve before said steps (b)–(e), wherein:
   said step (b) comprises determining the location of a plurality of poles on said expanded curve by determining an expected value on said expanded curve for a plurality of flow rates of liquid flowing through the meter;
   said step (c) comprises computing error in said expanded curve at the location of said plurality of poles by determining the difference between the flow rate or volume of liquid indicated by said expanded curve at the location of said plurality of poles and said plurality of flow rates or volumes for said plurality of poles; and
   said step (e) comprises correcting said expanded curve to form a corrected curve by applying said error correction to said expanded curve at the location of said plurality of poles and using linear interpolation to correct said expanded curve at points adjacent said plurality of poles.

3. The method of claim 2, further comprising expressing said corrected curve in a number of finite points equal to the number of finite points of said meter calibration curve after said step (e).

4. The method of claim 1, wherein said meter calibration curve is received from memory in the meter in said step of receiving.

5. The method of claim 1, further comprising loading said corrected curve into memory in the meter.

6. The method of claim 1, wherein said meter calibration curve is a Roshko-Strouhal curve.

7. The method of claim 1, wherein said step (d) comprises computing an error correction coefficient for said meter calibration curve at each of said plurality of poles based on said computed error in said step (c).

8. The method of claim 7, wherein said step (e) is comprised of multiplying said error correction coefficient with said meter calibration curve at the location of said plurality of poles and using linear interpolation to correct said meter calibration curve at points adjacent said plurality of poles.

9. A system for correcting a calibration curve of a meter used to measure fuel in a fuel dispenser, comprised of:
   a control system, wherein said control system:
   (a) receives a meter calibration curve used to determine flow rate or volume of a liquid flowing through the meter expressed in a finite number of data points;
   (b) determines a location of plurality of poles on said meter calibration curve by determining an expected value on said meter calibration curve for a plurality of flow rates or volumes of liquid flowing through the meter;
   (c) computes error in said meter calibration curve at the location of said plurality of poles by determining the difference between the flow rate or volume of liquid indicated by said meter calibration curve at the location of said plurality of poles and said plurality of flow rates or volumes for said plurality of poles;
   (d) computes an error correction for said meter calibration curve at each of said plurality of poles based on said computed error; and
   (e) corrects said meter calibration curve to form a corrected curve by applying said error correction to said meter calibration curve at the location of said plurality of poles and using linear interpolation to correct said meter calibration curve at points adjacent said plurality of poles.

10. The system of claim 9, wherein said control system expands said meter calibration curve using linear interpolation to create an expanded curve having a greater number of data points than said meter calibration curve before performing said functions (b)–(e), wherein:
    said function (b) comprises said control system determining the location of a plurality of poles on said expanded curve by determining an expected value on said expanded curve for a plurality of flow rates of liquid flowing through the meter;
    said function (c) comprises said control system computing error in said expanded curve at the location of said plurality of poles by determining the difference between the flow rate or volume of liquid indicated by said expanded curve at the location of said plurality of poles and said plurality of flow rates or volumes for said plurality of poles; and
    said function (e) comprises said control system correcting said expanded curve to form a corrected curve by applying said error correction to said expanded curve at the location of said plurality of poles and using linear interpolation to correct said expanded curve at points adjacent said plurality of poles.

11. The system of claim 10, wherein said control system expresses said corrected curve in a number of finite points equal to the number of finite points of said meter calibration curve.

12. The system of claim 9, wherein said control system receives said calibration curve from memory in the meter.

13. The system of claim 9, wherein said control system loads said corrected curve into memory in the meter.

14. The system of claim 9, wherein said meter calibration curve is a Roshko-Strouhal curve.

15. The system of claim 9, wherein said control system computes an error correction at each of said plurality of poles by computing an error correction coefficient for said meter calibration curve at each of said plurality of poles based on said computed error.

16. The system of claim 15, wherein said control system multiplies said error correction coefficient with said meter calibration curve at the location of said plurality of poles and uses linear interpolation to correct said meter calibration curve at points adjacent said plurality of poles.

17. A method of correcting a Roshko-Strouhal curve of a turbine flow meter used to measure fuel in a fuel dispenser, comprising the steps of:
  (a) receiving a Roshko-Strouhal curve used to determine flow rate of liquid passing through the turbine meter expressed in a finite number of data points;
  (b) expanding said Roshko-Strouhal curve using linear interpolation to create an expanded Roshko-Strouhal curve having a greater number of data points than said Roshko-Strouhal curve;
  (c) determining a location of a plurality of poles on said expanded Roshko-Strouhal curve by determining an expected value on said expanded Roshko-Strouhal curve for a plurality of flow rates of liquid flowing through the turbine meter;
  (d) computing error in said expanded Roshko-Strouhal curve at the location of said plurality of poles by determining the difference between the flow rate or volume of liquid indicated by said expanded Roshko-Strouhal curve at the location of said plurality of poles and said plurality of flow rates or volumes for said plurality of poles;
  (e) computing an error correction for said expanded Roshko-Strouhal curve at each of said plurality of poles based on said computed error in step (d);
  (f) correcting said expanded Roshko-Strouhal curve to form a corrected expanded Roshko-Strouhal curve by applying said error correction to said expanded Roshko-Strouhal curve at the location of said plurality of poles and using linear interpolation to correct said expanded Roshko-Strouhal curve at points adjacent said plurality of poles;
  (g) expressing said corrected expanded Roshko-Strouhal curve in a number of finite points equal to the number of finite points of said Roshko-Strouhal curve to form a corrected Roshko-Strouhal curve; and
  (h) storing said corrected Roshko-Strouhal curve in memory of the turbine meter.

* * * * *